United States Patent
Willmes (10) Patent No.: US 11,841,327 B2
(45) Date of Patent: Dec. 12, 2023

(54) DETECTION AND CHARACTERIZATION OF DEFECTS IN PHARMACEUTICAL CYLINDRICAL CONTAINERS

(71) Applicant: SCHOTT PHARMA SCHWEIZ AG, St. Gallen (CH)

(72) Inventor: Daniel Willmes, Langrickenbach (CH)

(73) Assignee: SCHOTT PHARMA SCHWEIZ AG, St. Gallen (CH)

( * ) Notice: Subject to any disclaimer, the term of this patent is extended or adjusted under 35 U.S.C. 154(b) by 195 days.

(21) Appl. No.: 17/157,080

(22) Filed: Jan. 25, 2021

(65) Prior Publication Data

US 2021/0231576 A1     Jul. 29, 2021

(30) Foreign Application Priority Data

Jan. 23, 2020 (EP) .................................... 20153330

(51) Int. Cl.
*G01N 21/892* (2006.01)
*G01N 21/89* (2006.01)

(52) U.S. Cl.
CPC ....... *G01N 21/892* (2013.01); *G01N 21/8901* (2013.01); *G01N 21/8914* (2013.01); *G01N 2021/8905* (2013.01)

(58) Field of Classification Search
CPC ............... G01N 21/90; G01N 21/9036; G01N 2021/8832; G01N 2201/06153; G01N 21/8803; G01N 21/9009; G01N 21/958; G01N 21/9054; G01N 21/9018; G01N 21/01; G01N 21/9045; G01N 15/1434; G01N 2021/8845; G01N 2021/8848; G01N 21/85; G01N 21/8806; G01N 21/8851; G01N 21/8914; G01N 21/892; G01N 23/10; G01N 15/0227; G01N 15/1463; G01N 2015/144; G01N 2015/1493; G01N 21/64; G01N 21/6428; G01N 21/9081; G01N 2033/0081; G01N 21/9072; G01N 21/763; G01N 2021/479; G01N 21/4788; G01N 21/6458; G01N 2021/0112; G01N 2021/8411; G01N 21/956;

(Continued)

(56) References Cited

U.S. PATENT DOCUMENTS 4,378,493 A    3/1983   Dorf
9,995,691 B2   6/2018   Piana
(Continued)

FOREIGN PATENT DOCUMENTS

CA       3134342 A1 * 3/2013 ......... G01N 15/1429
CN     107257921 A * 10/2017 ............ G01M 3/229
(Continued)

OTHER PUBLICATIONS

"Schott World", Jan. 2019, p. 20-21, cited in Third Party Observation for application No. EP20200153330, Jun. 10, 2021, with respective English translations.

*Primary Examiner* — Michael P Stafira
(74) *Attorney, Agent, or Firm* — Ruggiero McAllister & McMahon LLC (57) ABSTRACT

An apparatus for inspecting a pharmaceutical cylindrical container made of a polymer, a specific method for inspecting a pharmaceutical cylindrical container made of a polymer and a specific bundle of pharmaceutical cylindrical containers made of a polymer.

20 Claims, 5 Drawing Sheets

(58) Field of Classification Search
CPC ........... G01N 2021/8887; G01N 21/45; G01N 21/95; G01N 2291/044; G01N 2291/2695; G01N 33/00; G01B 11/24; G01J 2003/104; G01J 2003/106; G01J 3/10; G01J 3/463; G01J 3/465; G06T 2207/20084; G06T 2200/32; G06T 2207/10056; G06T 2207/10152; G06T 2207/20056; G06T 2207/30024; G06T 5/001; G06T 5/50; G06T 7/0012; G06T 7/33; G06T 11/60; G06T 2207/30072; G06T 7/0004; G06T 7/0006; G06T 2207/20104; G06T 2207/30108; G06T 7/11; G06T 7/12; G06T 7/136; G06T 7/187; G06T 2207/20081; G06T 2207/30121; G06T 2207/30168; G02B 21/367; G02B 21/06; G02B 21/086; G02B 27/58; G02B 21/365; G06V 20/693; G06V 20/698; G06V 10/25; G06V 10/26; G06V 10/457; G06V 10/50; G06V 10/24; G06V 10/40; G06V 10/70
See application file for complete search history.

(56) References Cited

U.S. PATENT DOCUMENTS

| | | |
|---|---|---|
| 2010/0095790 A1 | 4/2010 | Raupp |
| 2013/0084594 A1 | 4/2013 | Bresler |
| 2019/0049390 A1 * | 2/2019 | Veillon .................. G01N 21/90 |
| 2019/0164269 A1 * | 5/2019 | Kläger .................... G06T 7/571 |

FOREIGN PATENT DOCUMENTS

| | | | | |
|---|---|---|---|---|
| DE | 102011113670 | | 3/2013 | |
| DE | 102016114190 | | 2/2018 | |
| EP | 2381246 | | 10/2011 | |
| EP | 2774678 | | 9/2014 | |
| EP | 3797883 | | 3/2021 | |
| EP | 3798621 | | 3/2021 | |
| FR | 3016699 A1 * | 7/2015 | ............. G01N 21/90 |
| GB | 2350424 A * | 11/2000 | ............. G01N 21/90 |
| JP | 10336949 | | 4/1991 | |
| JP | 2000214104 | | 8/2000 | |
| JP | 2002509235 A * | 3/2002 | |
| JP | 2005227257 | | 8/2005 | |
| JP | 2009174927 | | 8/2009 | |
| JP | 2011220744 A * | 11/2011 | |
| JP | 2015169449 | | 9/2015 | |
| JP | 2018072180 A * | 5/2018 | |
| KR | 20100039562 A * | 4/2010 | |
| WO | WO-2011138297 A1 * | 11/2011 | ......... G01N 21/8803 |
| WO | WO-2017134086 A1 * | 8/2017 | ......... G01N 21/8806 |
| WO | WO-2017207846 A1 * | 12/2017 | ......... B21D 51/2638 |
| WO | WO-2018061196 A1 * | 4/2018 | ......... G01N 21/8806 |
| WO | WO-2018158824 A1 * | 9/2018 | ......... G01N 21/8806 |

* cited by examiner

DETECTION AND CHARACTERIZATION OF DEFECTS IN PHARMACEUTICAL CYLINDRICAL CONTAINERS

CROSS REFERENCE TO RELATED APPLICATIONS

This application claims benefit under 35 USC § 119 of European Application 20 153 330.4 filed Jan. 23, 2020, the entire contents of which are incorporated herein by reference.

BACKGROUND

1. Field of the Invention

The present invention relates to a specific apparatus for inspecting a pharmaceutical cylindrical container made of a polymer, wherein the apparatus comprises a support device, a light receiving unit and a light emitting unit. The present invention also relates to a specific method for inspecting a pharmaceutical cylindrical container made of a polymer. Furthermore, the present invention relates to an improved bundle of pharmaceutical cylindrical containers made of a polymer.

2. Description of Related Art

For quality assurance, it is common to inspect the finished pharmaceutical cylindrical container or intermediate products thereof during a manufacturing process. If a defect is detected the product or the intermediate product can be disregarded from further processing.

From the document DE 10 2011 113 670 A1 an apparatus for the inspection of sheet glass is known. Further, the document DE 10 2016 114 190 A1 describes a method and a device for optical examination of transparent bodies.

Especially pharmaceutical cylindrical containers such as syringes, cartridges, vials, etc., have to fulfil strict quality standards. For example, it has to be avoided that these pharmaceutical cylindrical containers comprise defects like slides, bulges, depressions, scratches, adhering particles, bubbles or trapped foreign material. Since pharmaceutical cylindrical containers are mass products, there is a need to develop an inspection system, which can measure the pharmaceutical cylindrical container very fast. Notwithstanding, it has to be assured that pharmaceutical cylindrical containers comprising any defects are reliably identified such that they can be disregarded from further processing. Furthermore, there are some failures, which could not be visualized by using common optics. Especially optical defects like slides are usually not very easy to detect.

Known apparatuses for inspecting pharmaceutical cylindrical containers do not fulfil the above-mentioned requirements with regard to a fast, variable and reliable inspection.

SUMMARY

The invention described herein addresses the problem of improving and further developing an apparatus and a method for inspecting a pharmaceutical cylindrical container made of a polymer such that a fast and reliable inspection is achieved. In addition, the invention refers to an improved bundle of pharmaceutical cylindrical containers made of a polymer.

In an embodiment, the present invention provides an apparatus for inspecting a pharmaceutical cylindrical container made of a polymer, wherein the apparatus comprises a support device, a light receiving unit and a light emitting unit, wherein the support device supports the pharmaceutical cylindrical container, such that the cylindrical pharmaceutical container is rotatable around its longitudinal axis, wherein the light emitting unit comprises a light source and is configured to illuminate the pharmaceutical cylindrical container with an inspection beam, and wherein the light receiving unit comprises a camera and is configured to receive light emitted by the pharmaceutical cylindrical container for acquiring an image of at least a part of the pharmaceutical cylindrical container.

In a further embodiment, the present invention provides a method for inspecting a pharmaceutical cylindrical container made of a polymer, preferably by using an apparatus described herein, comprising the following steps: illuminating the pharmaceutical cylindrical container with a light emitting unit, receiving light emitted by the pharmaceutical cylindrical container with a light receiving unit for acquiring an image of the pharmaceutical cylindrical container, and characterizing defects in and/or on the pharmaceutical cylindrical container based on the obtained image.

In a further embodiment, the present invention provides a bundle of pharmaceutical cylindrical containers made of a polymer, preferably being inspected by an apparatus described herein and/or a method described herein, wherein the bundle comprises 10 or more, preferably 10 to 1000, more preferably 20 to 500, most preferably 40 to 250, pharmaceutical cylindrical containers, and wherein the pharmaceutical cylindrical containers exhibit a value Y in the following equation of about 0.5 or less, preferably 0.4 or less, more preferably 0.3 or less, more preferably 0.2 or less, more preferably 0.1 or less, more preferably 0.05 or less, more preferably 0.01 or less: $Y=A/B$. A is the maximum length in cm of any slide in the cylindrical part of the pharmaceutical cylindrical container, and B is the length in cm of the cylindrical part of the pharmaceutical cylindrical container; and/or wherein the pharmaceutical cylindrical containers exhibit a value Z in the following equation of about 0.5 or less, preferably 0.4 or less, more preferably 0.3 or less, more preferably 0.2 or less, more preferably 0.1 or less, more preferably 0.05 or less, more preferably 0.01 or less: $Z=A/B$; wherein A is the area in $cm^2$ of the slide(s) in the cylindrical part of the pharmaceutical cylindrical container, and wherein B is the area in $cm^2$ of the cylindrical part of the pharmaceutical cylindrical container.

An advantage of the invention is that by acquiring an image on basis of the light emitted by the cylindrical pharmaceutical container even optical specific defects like slides or very small defects can be visualized and hence detected. Furthermore, the defect classification is optimized by using the light emitted from the container as a feature to separate them from other defect classes.

The term "pharmaceutical cylindrical container" refers to a cylindrical container, which can be used to store medical products, e.g. injection solutions or tablets. A pharmaceutical cylindrical container can be a syringe, a vial, an ampoule, a cartridge or any special article of tubing and comprising at least a cylindrical part. Hence, not the whole container has to be cylindrical for being a pharmaceutical cylindrical container. The diameter of the cylindrical part of the pharmaceutical cylindrical container(s) being inspected by the apparatus according to the invention may be in the range of 4 mm to 80 mm, preferably 6 mm to 50 mm. Preferably, the apparatus comprises one pharmaceutical cylindrical container. Preferably, the pharmaceutical cylindrical container is produced by injection molding, i.e. it is preferably an injection molded pharmaceutical cylindrical container. Injection molding is a cheap and reliable method to produce pharmaceutical cylindrical containers made of a polymer.

The term "longitudinal axis" refers to the line, especially the rotational axis that passes from the bottom to the top of the cylindrical part of the pharmaceutical cylindrical container. The diameter of the cylindrical part of the pharmaceutical cylindrical container to be measured can also be determined by the support device that supports the pharmaceutical cylindrical container, if the pharmaceutical cylindrical container is not present in the apparatus. For example, if the support device supports the pharmaceutical cylindrical container on its lateral surface, the support device may comprise three wheels for supporting the pharmaceutical cylindrical container and by these three wheels the circumference of the pharmaceutical cylindrical container can be defined.

Herein a "pharmaceutical cylindrical container" comprises at least a cylindrical part. A pharmaceutical cylindrical container like a syringe, a cartridge or an ampule that comprises for example non-cylindrical ends is therefore a pharmaceutical cylindrical container. Herein, the lateral surface of the pharmaceutical cylindrical container does not have to be smooth. The lateral surface can comprise grooves or ridges or ripples or any other structure. Further, the lateral surface can have a waved or any other shape as long as the pharmaceutical cylindrical container exhibits a longitudinal axis and can be rotated around its longitudinal axis.

Herein, a bundle is a trading, loading or packaging unit for distribution of pharmaceutical cylindrical containers. For example, products usually of the same kind are combined as bundles when ordered together in retail or bundled in logistics. According to the invention, pharmaceutical cylindrical containers in the bundle can be separated by a spacer, for example a plastic or paper sheet or can be positioned in a holding device, for example a nest or tub, so that they are not in contact with each other during transport. Usually, but not necessarily, the bundle is at least partly covered by a plastic foil. Preferably, one bundle is encased in a plastic foil; more preferably, the bundle is encased in a plastic foil and all pharmaceutical cylindrical containers are sterilized, e.g. steam sterilized or sterilized by gamma rays. Due to economic reasons, the distance between two cylindrical bodies in a bundle is preferably less than 5 mm, more preferably less than 3 mm, more preferably less than 1 mm, more preferably less than 0.5 mm; most preferably to further reduce the size and weight of a bundle, the cylindrical bodies are in direct contact to each other. A bundle contains normally 10 or more, preferably 10 to 1000, more preferably 20 to 500, most preferably 40 to 250 pharmaceutical cylindrical containers. Examples of a bundle are the iQ™ platforms, i.e. the ready to use platforms cartriQ™, the adaptiQ® or the syriQ® from SCHOTT AG. One or more, preferably 10 to 50, bundles can be stacked on a pallet or packed in a further box for transport. Thus, in one embodiment, a transport box comprises one or more, preferably 5 to 50, more preferably 10 to 25, herein described bundles.

The term "emitted" with regard to the pharmaceutical container refers to the light emitted by the pharmaceutical cylindrical container after absorption of photons, i.e. photoluminescence, preferably fluorescence and/or phosphorescence, caused by the illumination of the container with the light of the light source.

According to the invention, the pharmaceutical cylindrical container is made of a polymer. According to a preferred embodiment, the pharmaceutical cylindrical container is made of a cycloolefin copolymer (COC) or a cycloolefin polymer (COP), more preferably a cycloolefin copolymer (COC). An advantage of these materials is that they fulfill the requirements for using them in the field of pharmaceutical containers and that they are easy to handle. Furthermore, especially these materials, i.e. defects like slides in the material, can be detected for example due to fluorescence and/or phosphorescence.

A slide herein is a portion in the material of a pharmaceutical cylindrical container, which appears bright in the visible region compared to the rest of the material when illuminated with light, preferably UV light, i.e. which emits light, wherein scattered or reflected light is not emitted light. The length and area of slide can be calculated as follows:

An image of the emitted light of the cylindrical part of the pharmaceutical cylindrical container is acquired which is neither overexposed nor underexposed. A person skilled in the art knows how to acquire such an image. The entire cylindrical part of the pharmaceutical cylindrical container is acquired by at least 1000, e.g. $1*10^6$, pixels. The pharmaceutical cylindrical container is rotated in between each image acquisition by a specific angle, e.g. 5°, to obtain 360° view of the cylindrical part of the pharmaceutical cylindrical container. The dynamic range of the sensor is 1:100 or more, e.g. 1:256. The darkest point of the obtained image is set to 10% of the total number of the dynamic range, e.g. if the dynamic range is 1:100, the darkest point is set to a value of 10 (=10% of 100). A pixel representing a slide is a pixel, which has a value of 50% or more in the range of the dynamic range, e.g. if the dynamic range is 1:100, a pixel representing a slide is a pixel having a value of 50 (=50% of 100) or more in the range of the dynamic range. Preferably, the image is a black and white image of the visible range of the electromagnetic spectrum. Preferably, the image is acquired with the camera acA1920-155 um from Basler with the sensor IMX174 CMOS from Sony.

According to the invention, the apparatus comprises a support device, wherein the support device supports the pharmaceutical cylindrical container, such that the cylindrical pharmaceutical container is rotatable around its longitudinal axis.

In a preferred embodiment, the support device supports the pharmaceutical cylindrical container either on its lateral surface or at an end part of the pharmaceutical cylindrical container. In a preferred embodiment, the support device supports the pharmaceutical cylindrical container at an end part of the pharmaceutical cylindrical container and wherein the support device is not in contact with the cylindrical part of the pharmaceutical cylindrical container. This can for example be achieved by supporting the pharmaceutical cylindrical container at the neck portion of a vial or at the flange of a syringe, i.e. introduce the pharmaceutical cylindrical container into a socket of the support device. Such a support device is advantageous for objects like vials, cartridges, syringes or the like, that comprise an end part with a different diameter than the cylindrical part of the container. In another embodiment, the support device supports the pharmaceutical cylindrical container on its lateral surface. Supporting the pharmaceutical cylindrical container on its lateral surface is advantageous because the container is hold securely and is rotatable precisely around its longitudinal axis (see European patent applications 19200246.7 and 19200221.0).

According to the invention, the apparatus comprises a light emitting unit, wherein the light emitting unit comprises a light source and is configured to illuminate the pharmaceutical cylindrical container with an inspection beam.

In a preferred embodiment, the light source emits light comprising a wavelength in the range of 10 nm to 1000 nm, preferably 100 nm to 400 nm, more preferably 220 nm to 380 nm. Using such a light source has the advantage that photoluminescence of the pharmaceutical cylindrical container is stimulated such that defects, for example slides or small defects in the pharmaceutical cylindrical container, can be identified.

According to a preferred embodiment, the light source is an ultraviolet gas-discharge lamp and/or an ultraviolet light-emitting diode and/or an ultraviolet laser, preferably an ultraviolet light-emitting diode and/or an ultraviolet laser. These light sources have the advantage, that they emit ultraviolet light, which is used for stimulating photoluminescence of the pharmaceutical cylindrical container.

In a preferred embodiment, the apparatus comprises two or more, preferably 2 to 20, more preferably 5 to 18 light emitting units comprising each a light source. The light emitting units may have a different wavelength and/or intensity and/or size and they may have different polarization of the light. According to a preferred embodiment, the apparatus comprises a light emitting unit, wherein the light emitting unit comprises a light source and is configured to illuminate the pharmaceutical cylindrical container with an linear polarized or unpolarized, preferably linear polarized, inspection beam and more preferably the apparatus comprises a second light emitting unit, wherein the second light emitting unit comprises a light source and is configured to illuminate the pharmaceutical cylindrical container with an inspection beam, preferably a linear polarized or unpolarized, preferably unpolarized, inspection beam. Using different polarizations makes it easily possible to differentiate emitted light from scattered or transmitted light.

According to the invention, the apparatus comprises a light receiving unit wherein the light receiving unit comprises a camera and is configured to receive light emitted by the pharmaceutical cylindrical container for acquiring an image of at least a part of the pharmaceutical cylindrical container, preferably the whole pharmaceutical cylindrical container.

In a preferred embodiment, the light received by the light receiving unit comprises a wavelength in the range of 300 nm to 700 nm, preferably 400 nm to 500 nm, more preferably 430 nm to 460 nm. By using a light receiving unit that is configured to receive and preferably differentiate light of the before-mentioned wavelength, the light emitted by the pharmaceutical cylindrical container due to photoluminescence, for example fluorescence and/or phosphorescence, can be extensively detected and an image of at least a part of the container can be acquired.

In a preferred embodiment, the light receiving unit comprises a camera and a lens, wherein the lens is permeable for light having a wavelength in the range of 200 nm to 900 nm, preferably 400 nm to 800 nm, more preferably 400 to 500, more preferably 430 to 460.

According to a preferred embodiment, the light receiving unit comprises a filter, wherein the filter blocks light having a wavelength of 600 nm or more, preferably 500 nm or more, more preferably 460 nm or more; and/or light having a wavelength of 200 nm or less, preferably 300 nm or less, more preferably 400 nm or less, more preferably 430 nm or less.

In a preferred embodiment, the apparatus comprises a polarizer, wherein the polarizer is more preferably between the pharmaceutical cylindrical container and the light receiving unit. In another preferred embodiment, the light receiving unit comprises a polarization camera. In a specific arrangement (for example with an illumination with linear polarized light (see above)), this makes it possible that emitted light can be easily differentiated from scattered and/or transmitted light.

Preferably, the light source is a top-light. A top light has the advantage that defects on the front side of cylindrical body, i.e. the wall directed to the light receiving unit, become easily visible and can be detected with higher accuracy.

In a preferred embodiment, the longitudinal axis of the pharmaceutical cylindrical container and a horizontal axis being perpendicular to the longitudinal axis define a horizontal plane, and wherein the centerline of the camera intersects the horizontal plane at an angle of 0° or more and 30° or less, preferably 0° or more and 20° or less, more preferably 0° or more and 10° or less, most preferably about 0°, and/or wherein the longitudinal axis of the pharmaceutical cylindrical container and a vertical axis being perpendicular to the longitudinal axis define a vertical plane, and wherein the centerline of the camera intersects the vertical plane at an angle of 60° or more and 90° or less, preferably 70° or more and 90° or less, more preferably 80° or more and 90° or less, most preferably about 90°, and/or wherein a horizontal axis being perpendicular to the longitudinal axis of the pharmaceutical cylindrical container and a vertical axis being perpendicular to the longitudinal axis and intersecting the middle of a cylindrical part of the pharmaceutical cylindrical container define a transversal plane, and wherein the centerline of the camera intersects the transversal plane at an angle of 0° or more and 30° or less, preferably 0° or more and 20° or less, more preferably 0° or more and 10° or less, most preferably about 0°.

In a preferred embodiment, the longitudinal axis of the pharmaceutical cylindrical container and a horizontal axis being perpendicular to the longitudinal axis define a horizontal plane, and wherein the centerline of the camera and/or, preferably and, the centerline of the light source intersect(s) the horizontal plane at an angle of 0° or more and 50° or less, preferably 0° or more and 30° or less, preferably 0° or more and 20° or less, more preferably 0° or more and 10° or less, most preferably about 0°, and/or wherein the longitudinal axis of the pharmaceutical cylindrical container and a vertical axis being perpendicular to the longitudinal axis define a vertical plane, and wherein the camera and/or, preferably and, the centerline of the light source intersect(s) the vertical plane at an angle of 45° or more and 90° or less, preferably 60° or more and 90° or less, preferably 70° or more and 90° or less, more preferably 80° or more and 90° or less, most preferably about 90°, and/or wherein a horizontal axis being perpendicular to the longitudinal axis of the pharmaceutical cylindrical container and a vertical axis being perpendicular to the longitudinal axis and intersecting the middle of a cylindrical part of the pharmaceutical cylindrical container define a transversal plane, and wherein the centerline of the camera and/or, preferably and, the centerline of the light source intersect(s) the transversal plane at an angle of 0° or more and 50° or less, preferably 0° or more and 30° or less, preferably 0° or more and 20° or less, more preferably 0° or more and 10° or less, most preferably about 0°.

In a preferred embodiment, the centerline of the camera and/or, preferably and, the centerline of the light source touches the pharmaceutical cylindrical container, preferably, the middle region of the pharmaceutical cylindrical container, more preferably the middle of the cylindrical part of the pharmaceutical cylindrical container.

In a preferred embodiment, the apparatus comprises a light emitting unit A, a light receiving unit B and a light receiving unit C, wherein the light emitting unit A comprises a light source A and is configured to illuminate the pharmaceutical cylindrical container with an inspection beam, and wherein the light receiving unit B comprises a camera B and is configured to receive light emitted by the pharmaceutical cylindrical container, preferably illuminated by light emitting unit A, for acquiring an image of at least a part of the pharmaceutical cylindrical container, and wherein the light receiving unit C comprises a camera C and is configured to receive light scattered by and/or transmitted through the pharmaceutical cylindrical container, preferably illuminated by light emitting unit A, for acquiring an image of at least a part of the pharmaceutical cylindrical container.

This arrangement can be achieved for example if the light source A is arranged with regard to the pharmaceutical cylindrical container on the opposite side of light receiving unit C and the light source A is with regard to the light receiving unit B a top-light. This allows a compact arrangement of the light source(s) and cameras and more cameras, e.g. 10 or more, preferably 10 to 25, can be incorporated in the apparats. In addition, the inspection time can be reduced since with acquiring one light source, both (kind of) images can be acquired.

In a further embodiment, the present invention provides a method for inspecting a pharmaceutical cylindrical container made of a polymer, preferably by using an apparatus comprising the following steps: illuminating the pharmaceutical cylindrical container with a light emitting unit, receiving light emitted by the pharmaceutical cylindrical container with a light receiving unit for acquiring an image of the pharmaceutical cylindrical container, and characterizing defects in and/or on the pharmaceutical cylindrical container based on the obtained image.

With this method, it is possible to detect irregularities in the pharmaceutical cylindrical container, for example slides. In addition, even very small defects get visible and can be characterized. One reason therefore might be that around small defects, the polymer is formed different and since the area of the different form of the polymer is significantly larger than the defect itself and is visible in an image showing the emitted light of the container, it is possible to detect even defects which are below the lower detection limit of the camera of the receiving unit. Further, the inventors surprisingly found out, that the possibility to detect and characterize specific types of defects, like slides or very small defects, can be significantly improved, if the defect is characterized by the comparison of an image which shows the emitted light of the container with an image showing scattered and/or transmitted light.

Therefore, in a preferred embodiment, the method further comprises the following steps: illuminating the pharmaceutical cylindrical container with the same and/or a further light emitting unit, receiving light scattered by and/or transmitted through the pharmaceutical cylindrical container, preferably illuminated by the same light emitting unit, with the same or a further, preferably a further, light receiving unit for acquiring an image of the pharmaceutical cylindrical container, characterizing defects in and/or on the pharmaceutical cylindrical container based on the obtained images.

For realizing the above-described illumination, the same or a further light emitting unit can be arranged. Furthermore, the wavelength of the light used in the herein described apparatus can be different from the wavelength of the light used for performing the herein described method. By receiving and analyzing the light being scattered by and/or transmitted through the pharmaceutical cylindrical container, other defects can be made visible, for example cracks etc. Pharmaceutical cylindrical containers, especially pharmaceutical cylindrical containers made of COC or COP, are normally produced by injection molding. Thereby a plurality of slides may arise. The amount and size of the slides depend on many factors like temperature, injection speed and so forth. Even under very good conditions, it is not possible to suppress the formation of slides, which may extend over the whole length of the cylindrical part of the pharmaceutical cylindrical container. In addition, also the formation of many slides extending over a huge area of the cylindrical part of the pharmaceutical cylindrical container may occur using common technics. In summary, the formation process/conditions of slides in polymers is not understood completely. Thus, since it is not possible to predict the formation, size and amount of slides, to ensure whether a pharmaceutical cylindrical container exhibits a specific slide or area of slides is only possible by inspecting the container after production.

According to a preferred embodiment, the image(s) is/are analyzed in order to detect slides in the polymer of the pharmaceutical cylindrical container, and/or the image is analyzed to optimize and/or control the process of manufacturing the pharmaceutical cylindrical container, and/or the pharmaceutical cylindrical container is disregarded from further processing if the pharmaceutical cylindrical container exhibits a value of Y in the following equation of about 1.0, preferably 0.9 to 1.0, more preferably 0.8 to 1.0, more preferably 0.7 to 1.0, more preferably 0.6 to 1.0, more preferably 0.5 to 1.0, more preferably 0.4 to 1.0, more preferably 0.3 to 1.0, more preferably 0.2 to 1.0, more preferably 0.1 to 1.0, more preferably 0.05 to 1.0: $Y=A/B$. A is the maximum length in cm of any slide in the cylindrical part of the pharmaceutical cylindrical container, and B is the length in cm of the cylindrical part of the pharmaceutical cylindrical container The pharmaceutical cylindrical container is disregarded from further processing if the pharmaceutical cylindrical container exhibits a value of Z in the following equation of about 1.0, preferably 0.9 to 1.0, more preferably 0.8 to 1.0, more preferably 0.7 to 1.0, more preferably 0.6 to 1.0, more preferably 0.5 to 1.0, more preferably 0.4 to 1.0, more preferably 0.3 to 1.0, more preferably 0.2 to 1.0, more preferably 0.1 to 1.0, more preferably 0.05 to 1.0: $Z=A/B$. A is the area in $cm^2$ of the slide(s), and B is the area in $cm^2$ of the cylindrical part of the pharmaceutical cylindrical container.

In a further embodiment, the present invention provides a bundle of pharmaceutical cylindrical containers made of a polymer, preferably being inspected by an apparatus described herein and/or a method described herein, wherein the bundle comprises 10 or more, preferably 10 to 1000, more preferably 20 to 500, most preferably 40 to 250, pharmaceutical cylindrical containers, and wherein the pharmaceutical cylindrical containers exhibit a value Y in the following equation of about 0.5 or less, preferably 0.4 or less, more preferably 0.3 or less, more preferably 0.2 or less, more preferably 0.1 or less, more preferably 0.05 or less, more preferably 0.01 or less: $Y=A/B$. A is the maximum length in cm of any slide in the cylindrical part of the pharmaceutical cylindrical container, and B is the length in cm of the cylindrical part of the pharmaceutical cylindrical container In a further embodiment, the present invention provides a bundle of pharmaceutical cylindrical containers made of a polymer, preferably being inspected by an apparatus described herein and/or a method described herein, wherein the bundle comprises 10 or more, preferably 10 to 1000, more preferably 20 to 500, most preferably 40 to 250, pharmaceutical cylindrical containers, and wherein the pharmaceutical cylindrical containers exhibit a value Z in the following equation of about 0.5 or less, preferably 0.4 or less, more preferably 0.3 or less, more preferably 0.2 or less, more preferably 0.1 or less, more preferably 0.05 or less, more preferably 0.01 or less: Z=A/B. A is the area in cm² of the slide(s) in the cylindrical part of the pharmaceutical cylindrical container, and B is the area in cm² of the cylindrical part of the pharmaceutical cylindrical container.

In a preferred embodiment, the pharmaceutical cylindrical containers exhibit the above described values Y and Z.

Such a bundle of pharmaceutical cylindrical containers fulfills highest quality standards of products used for medical packaging. Slides may have an influence on the inspection after a pharmaceutical composition has been inserted in the pharmaceutical cylindrical container. It may happen that a slide influences the inspection system, which, for example, uses UV light to detect impurities in the pharmaceutical composition.

Hence, the chance of further processing a pharmaceutical cylindrical container containing a pharmaceutical composition that does comprise any impurities is minimized using the apparatus and/or method described herein.

A further embodiment provides an apparatus for inspecting a pharmaceutical cylindrical container made of a polymer, wherein the apparatus is configured such that the pharmaceutical cylindrical container is inspected in one second or less, preferably 0.9 seconds or less, more preferably 0.8 seconds or less, more preferably in 0.6 seconds to 0.9 seconds, preferably in 0.7 seconds to 0.8 seconds; and/or wherein the apparatus is configured such that slide(s) is/are detectable exhibiting a value Y in the following equation of about 0.5 or less, preferably 0.4 or less, more preferably 0.3 or less, more preferably 0.2 or less, more preferably 0.1 or less, more preferably 0.05 or less, more preferably 0.01 or less: Y=A/B. A is the maximum length in cm of any slide in the cylindrical part of the pharmaceutical cylindrical container and B is the length of the cylindrical part of the pharmaceutical cylindrical container. The apparatus is configured such that slide(s) is/are detectable exhibiting a value Z in the following equation of about 0.5 or less, preferably 0.4 or less, more preferably 0.3 or less, more preferably 0.2 or less, more preferably 0.1 or less, more preferably 0.05 or less, more preferably 0.01 or less: Z=A/B. A is the area in cm² of the slide(s) in the cylindrical part of the pharmaceutical cylindrical container, and B is the area in cm² of the cylindrical part of the pharmaceutical cylindrical container.

There are several ways how to design and further develop the teaching of the present invention in an advantageous way. To this end, the following explanation of preferred examples of embodiments of the invention, illustrated by the drawing on the other hand. In connection with the explanation of the preferred embodiments of the invention by the aid of the drawing, generally preferred embodiments and further developments of the teaching will be explained in the drawings.

DETAILED DESCRIPTION

In the following description of embodiments, the same reference numeral designate similar components.

Figure 1:
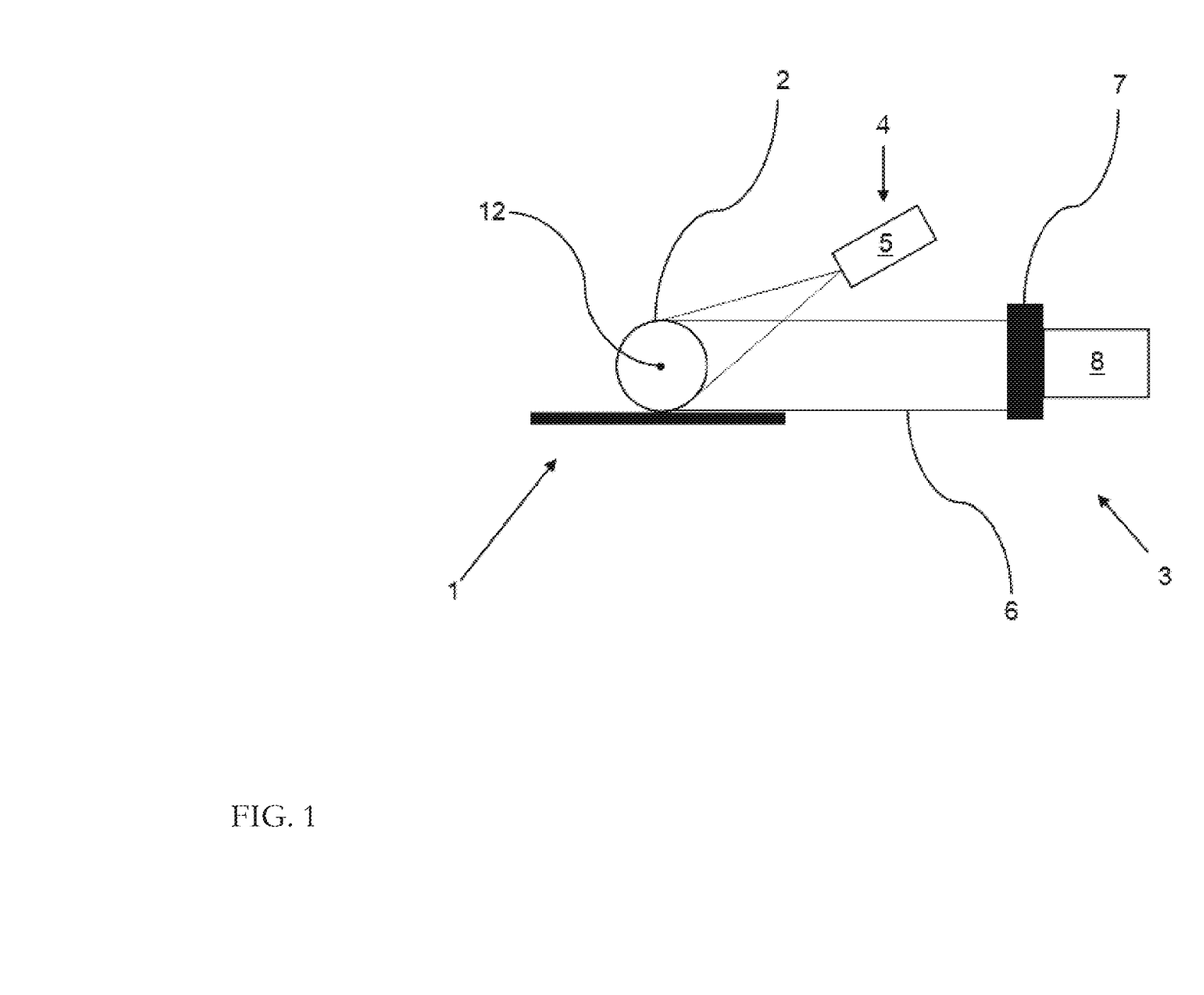
FIG. 1 shows in a schematic cross-sectional view an apparatus according to an embodiment of the present invention.

FIG. 1 shows an apparatus according to an embodiment of the present invention. The apparatus comprises a support device 1 for a pharmaceutical cylindrical container 2, a light receiving unit 3 and a light emitting unit 4.

The light emitting unit 4 comprises a light source 5 for illuminating the pharmaceutical cylindrical container 2 being positioned on the support device 1. The light 6 emitted by the pharmaceutical cylindrical container 2, i.e. the photoluminescence light, for example phosphorescence and fluorescence light, is received by the light receiving unit 3. In this embodiment, the light receiving unit 3 comprises a lens 7 and a camera 8. Hence, an image of at least a part of the pharmaceutical cylindrical container 2 can be acquired by camera 7, whereas defects, for example slides, can be identified on these images. In a preferred embodiment, the light source 5 is an ultraviolet light source, the lens 7 is at least permeable for light having a wavelength of 430 to 460 nm, and the camera 8 is a camera which can detect light in the visible region of the electromagnetic spectrum, e.g. the camera acA1920-155 um from Basler with the sensor IMX174 CMOS from Sony.

Figure 2:
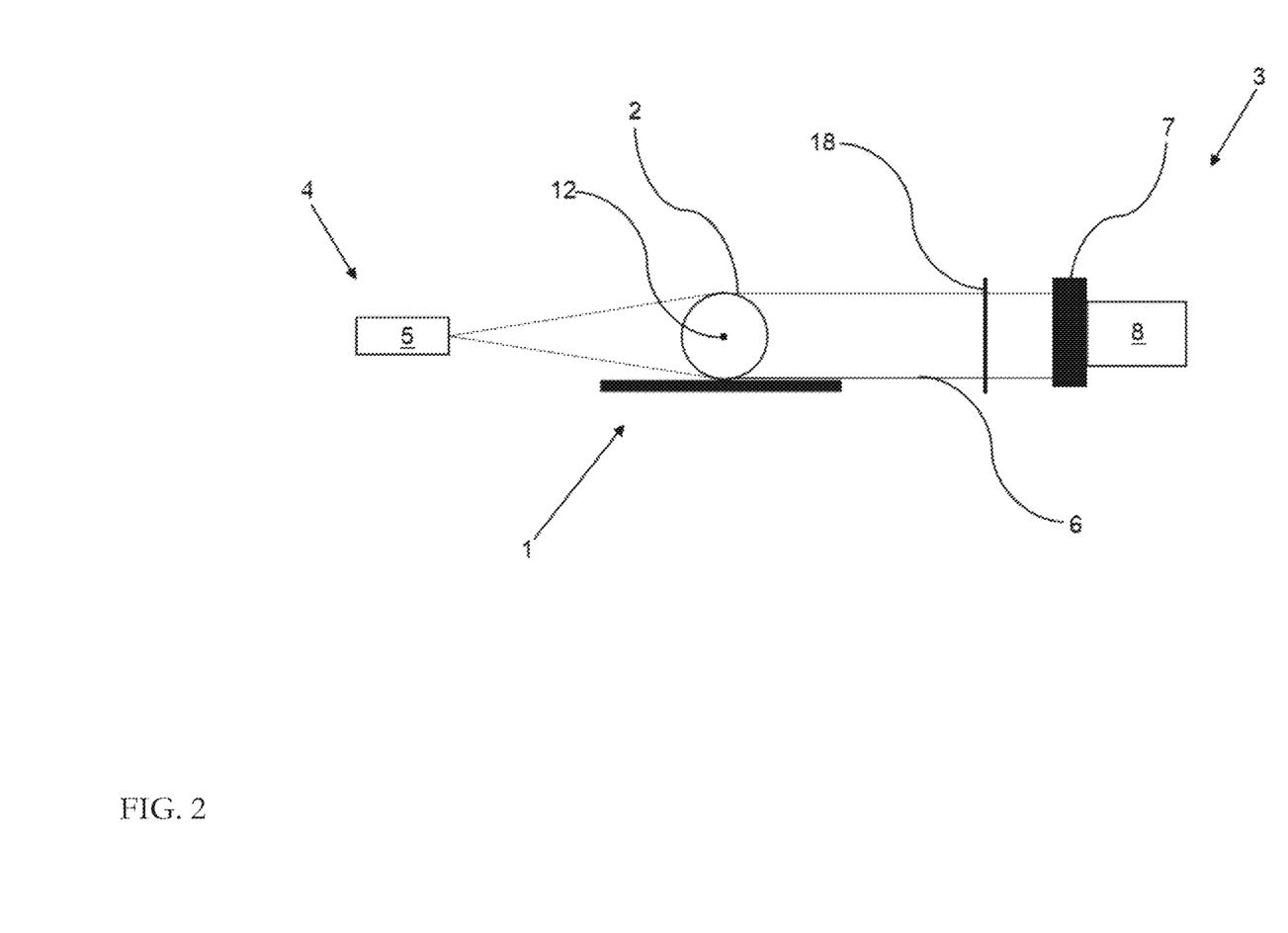
FIG. 2 shows in a schematic cross-sectional view an apparatus according to a further embodiment of the present invention.

FIG. 2 shows in a schematic cross-sectional view of the apparatus according to a further embodiment of the present invention. The apparatus shown in FIG. 2 corresponds to the apparatus described with FIG. 1, whereas the light receiving unit 3 further comprises a filter 18. In a preferred embodiment, the filter 18 selectively blocks light having a wavelength of 200 nm or less and 600 nm or more, preferably 300 nm or less and 500 nm or more, more preferably 300 nm or less and 460 nm or more, more preferably 300 nm or less and 430 nm or more.

Except for the filter 18 and the arrangement of the light emitting unit and light receiving unit, the embodiment of FIG. 2 corresponds to the embodiment of FIG. 1. As such, the description of FIG. 1 is referred to here, as it analogously applies to FIG. 2.

Figure 3:
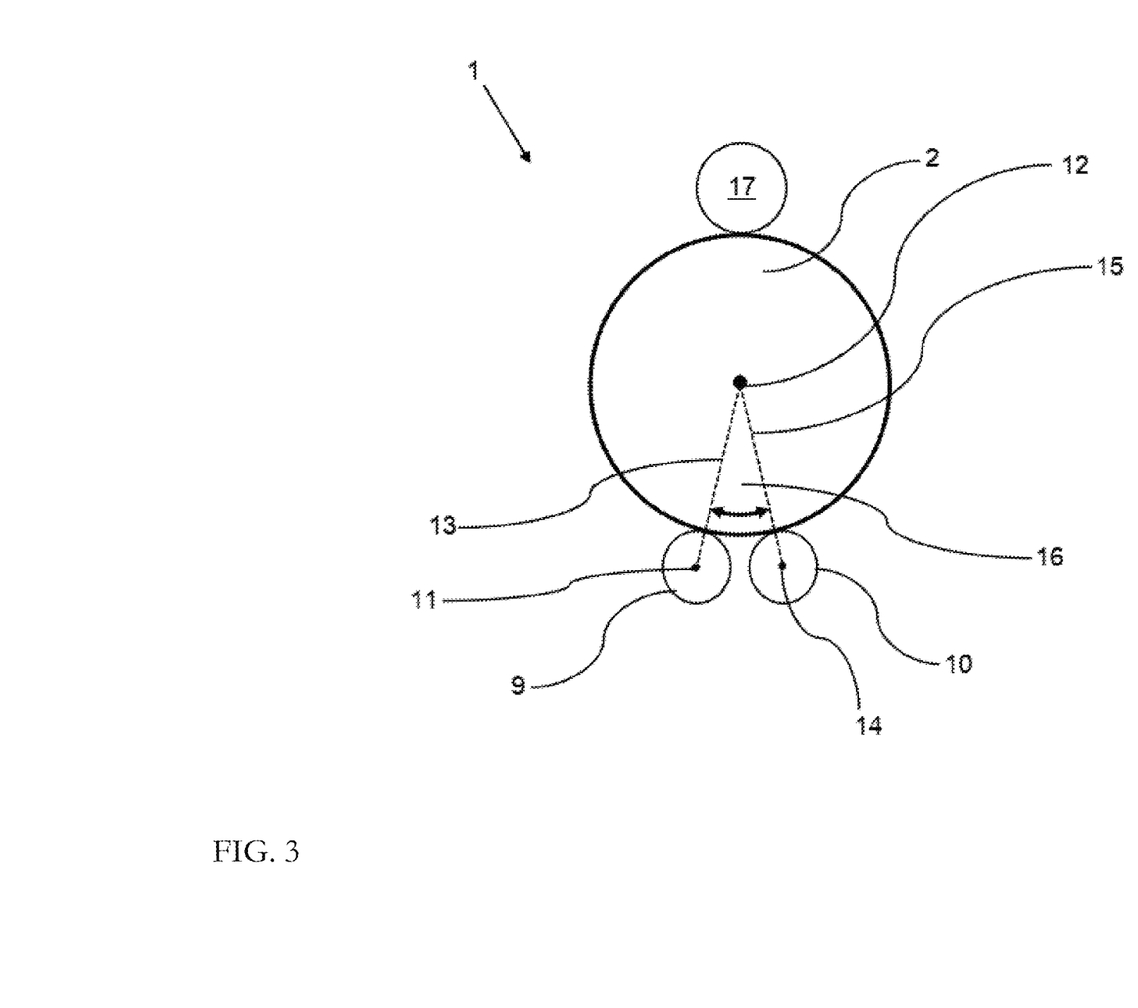
FIG. 3 shows in a schematic cross-sectional view an embodiment of a support device of the present invention.

Without being considered limiting with respect to the embodiments shown, FIG. 3 serves to illustrate an embodiment of a support device 1 for an apparatus according to the invention. The support device 1 comprises a first support wheel 9 and a second support wheel 10 as well as a container 2 being supported by the first support wheel 9 and the second support wheel 10. As can be seen, the rotational axis 11 of said first support wheel 9 and the longitudinal axis 12 of the container 2 define a first plane 13. Additionally the rotational axis 14 of the second support wheel 10 and said longitudinal axis 12 of the container 2 define a second plane 15. The first plane 13 and said second plane 15 intersect at an angle 16. According to a preferred embodiment, the angle 16 ranges from 45° to less than 120°, preferably 50° to 90°, more preferably of 60° to 80°, more preferably of 65° to 75°, most preferably at an angle of about 70°. One of ordinary skill in the art will understand, that the position of longitudinal axis 12 depends on the diameter of the container 2. Hence, when the apparatus is used for container 2 with different diameter, the position of the first and second support wheels 9, 10 has to be adapted. Furthermore, above the support device 1 a friction wheel 17 is arranged such that the container 2 can be rotated around its longitudinal axis 12. To illuminate the pharmaceutical cylindrical container, preferably a top-light is used (not shown).

Figure 4:
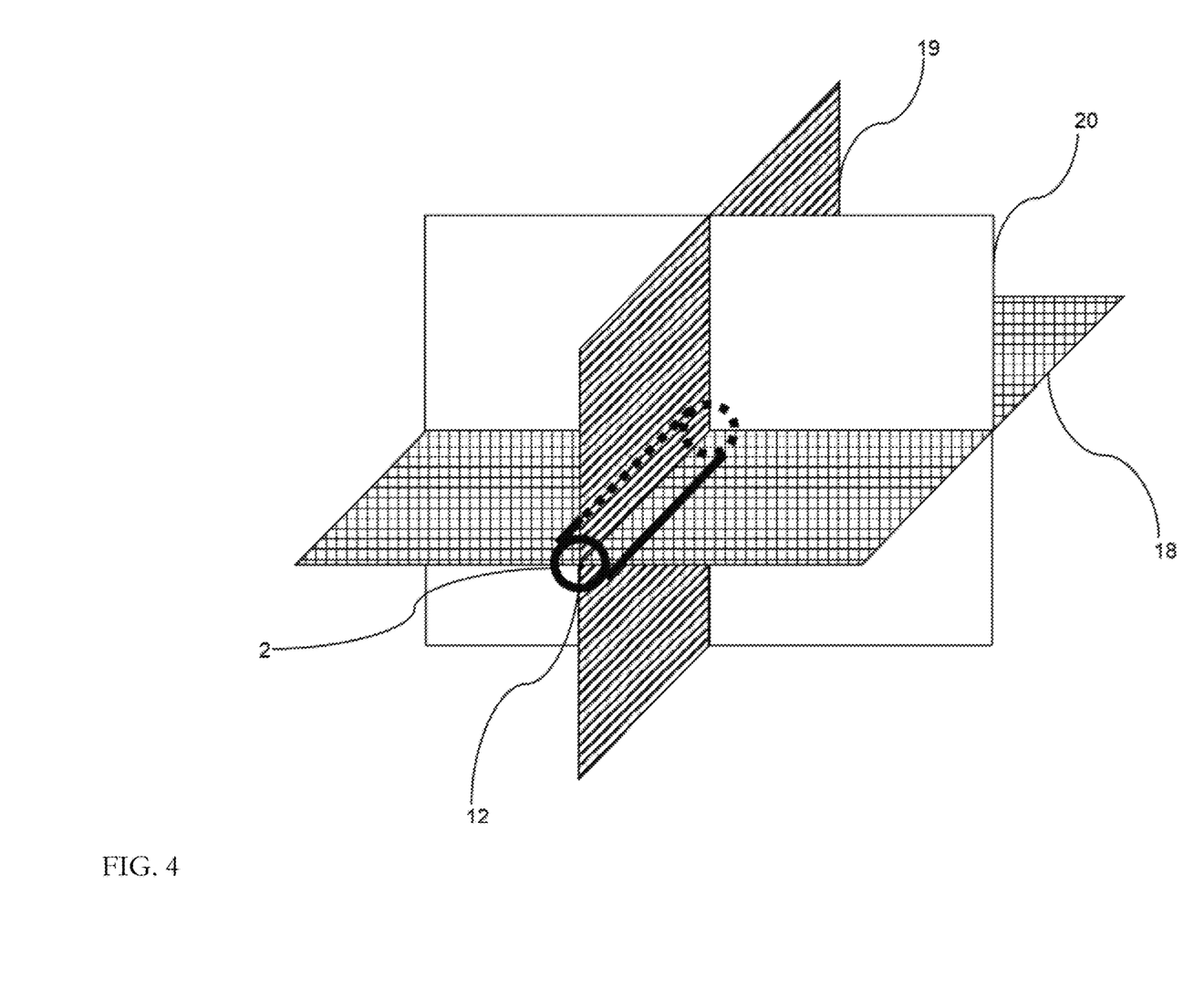
FIG. 4 shows in a schematic view the horizontal, vertical and transversal plane.

FIG. 4 shows a pharmaceutical cylindrical container 2 and its longitudinal axis 12. The longitudinal axis 12 and a horizontal axis being perpendicular define a horizontal plane 18. Further, the longitudinal axis 12 of the pharmaceutical cylindrical container 2 and a vertical axis being perpendicular to the longitudinal axis 12 define a vertical plane 19. In addition, a horizontal axis being perpendicular to the longitudinal axis 12 of the pharmaceutical cylindrical container 2 and a vertical axis being perpendicular to the longitudinal axis and intersecting the middle of a cylindrical part of the pharmaceutical cylindrical container define a transversal plane 20.

Figure 5:
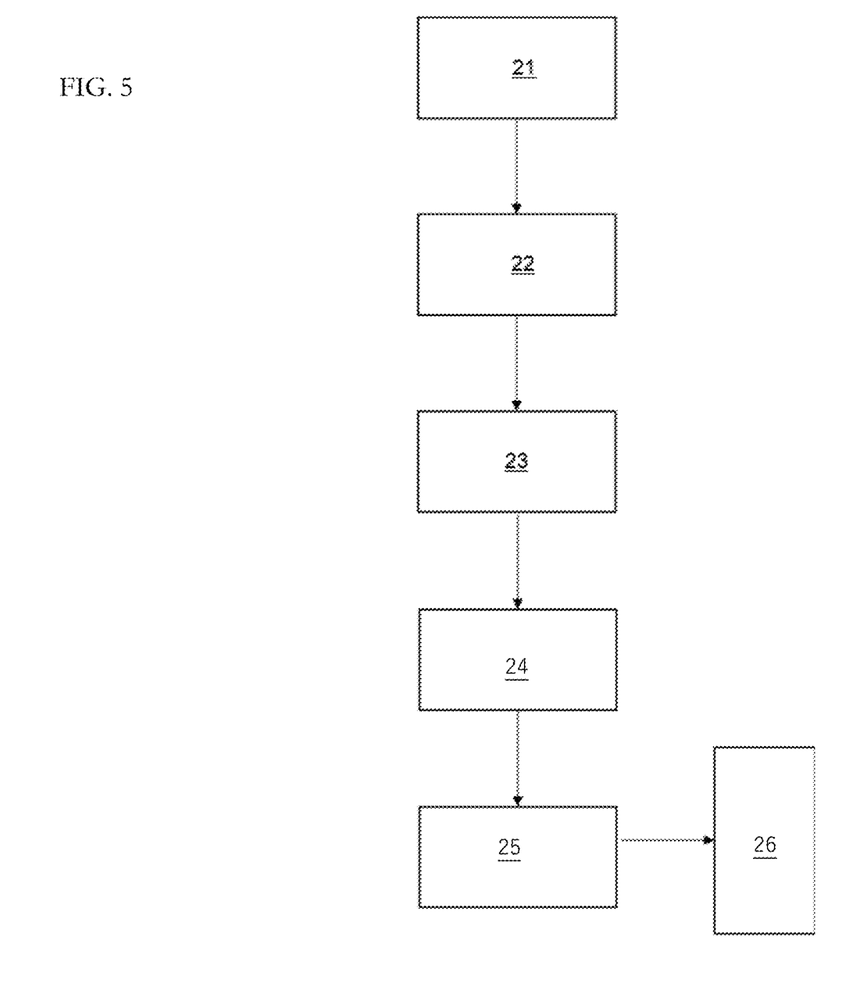
FIG. 5 shows a schematic block diagram of a method according to an embodiment of the invention.

FIG. 5 shows a block diagram of an embodiment of the method. The method serves for inspecting a pharmaceutical cylindrical container 2 made of a polymer. In a first step 21 the pharmaceutical cylindrical container 2 is illuminated with a light emitting unit 4. In a second step 22, the light 6 emitted by the pharmaceutical cylindrical container 2 is received by a light receiving unit 3 for acquiring an image of the pharmaceutical cylindrical container 2. In a third step 23 defects in and/or on the pharmaceutical cylindrical container 2 are characterized based on the obtained image.

In a fourth step 24, the image(s) is/are analyzed in order to detect slides in the pharmaceutical cylindrical container 2, and/or the image is analyzed to optimize and/or control the process of manufacturing the pharmaceutical cylindrical container 2, and/or the pharmaceutical cylindrical container 2 is disregarded from further processing when a slide having at least a predetermined length is detected. Further steps can be, illuminating the pharmaceutical cylindrical container with a, preferably a further, light emitting unit, then receiving light scattered by and/or transmitted through the pharmaceutical cylindrical container with a, preferably further, light receiving unit for acquiring an image of the pharmaceutical cylindrical container, and then characterizing defects in and/or on the pharmaceutical cylindrical container based on the obtained images.

In a fifth step 25, any defective pharmaceutical cylindrical containers are disregarded and the remaining containers are formed into a bundle of inspected pharmaceutical cylindrical containers 26. The bundle includes 10 or more, preferably 10 to 1000, more preferably 20 to 500, most preferably 40 to 250, pharmaceutical cylindrical containers, and wherein the pharmaceutical cylindrical containers exhibit a value Y in the following equation of about 0.5 or less, preferably 0.4 or less, more preferably 0.3 or less, more preferably 0.2 or less, more preferably 0.1 or less, more preferably 0.05 or less, more preferably 0.01 or less: Y=A/B. A is the maximum length in cm of any slide in the cylindrical part of the pharmaceutical cylindrical container, and B is the length in cm of the cylindrical part of the pharmaceutical cylindrical container; and/or wherein the pharmaceutical cylindrical containers in the bundle exhibit a value Z in the following equation of about 0.5 or less, preferably 0.4 or less, more preferably 0.3 or less, more preferably 0.2 or less, more preferably 0.1 or less, more preferably 0.05 or less, more preferably 0.01 or less: Z=A/B; wherein A is the area in $cm^2$ of the slide(s) in the cylindrical part of the pharmaceutical cylindrical container, and wherein B is the area in $cm^2$ of the cylindrical part of the pharmaceutical cylindrical container.

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

LIST OF REFERENCE SIGNS 1 support device
2 Container
3 light receiving unit
4 light emitting unit
5 light source
6 emitted light
7 Lens
8 Camera
9 first support wheel
10 second support wheel
11 rotational axis (first support wheel)
12 longitudinal axis (container)
13 first plane
14 rotational axis (second support wheel)
15 second plane
16 angle
17 friction wheel
18 horizontal plane
19 vertical plane
20 transversal plane
21 first step
22 second step
23 third step
24 fourth step
25 fifth step
26 bundle

What is claimed is:

1. An apparatus for inspecting a pharmaceutical cylindrical container made of a polymer and detecting slides in the polymer, comprising:
a support device configured to support the pharmaceutical cylindrical container and rotate the cylindrical pharmaceutical container around a longitudinal axis;
a light emitting unit comprising a light source configured to illuminate the pharmaceutical cylindrical container with an inspection beam having a wavelength from 100 nm to 400 nm to stimulate photoluminescence of the of the pharmaceutical cylindrical container; and
a light receiving unit that is configured to detect slides in the polymer, the light receiving unit comprising a filter that blocks light having a wavelength of 600 nm or more and a camera that receives light emitted by the pharmaceutical cylindrical container due to the photoluminescence and acquires an image of the pharmaceutical cylindrical container,
wherein the polymer is a cycloolefin copolymer (COC) or a cycloolefin polymer (COP).

2. The apparatus of claim 1, wherein the support device, the light emitting unit, and the light receiving unit are configured to inspect the pharmaceutical cylindrical container in one second or less.

3. The apparatus of claim 1, wherein the light source emits light comprising a wavelength from 220 nm to 380 nm.

4. The apparatus of claim 1, wherein the light source is a source selected from a group consisting of an ultraviolet gas-discharge lamp, an ultraviolet light-emitting diode, an ultraviolet laser, an ultraviolet light-emitting diode, an ultraviolet laser, and combinations thereof.

5. The apparatus of claim 1, wherein the light receiving unit is configured to receive light emitted by the pharmaceutical cylindrical container having a wavelength in a range selected from a group consisting of 300 nm to 700 nm, 400 nm to 500 nm, and 430 nm to 460 nm.

6. The apparatus of claim 1, wherein in the support device, the light emitting unit, and the light receiving unit are configured so that X=B−A,
wherein B is a wavelength of the light emitted by the pharmaceutical cylindrical container at a maximum, and
wherein A is a wavelength emitted by the light source of the light emitting unit at a maximum, and
X is in distance in a range selected from a group consisting of 50 nm to 500 nm, 75 nm to 500 nm, and 100 nm to 300 nm.

7. The apparatus of claim 1, wherein the light receiving unit further comprises a lens, wherein the lens is permeable for light having a wavelength in a range selected from a group consisting of 200 nm to 900 nm, 400 nm to 800 nm, 400 nm to 500 nm, and 430 nm to 460 nm.

8. The apparatus of claim 1, wherein the light receiving unit further comprises a filter, wherein the filter blocks light having a wavelength of 600 nm or more and/or a wavelength of 200 nm or less.

9. The apparatus of claim 1, wherein the support device supports the pharmaceutical cylindrical container so that the longitudinal axis and a horizontal axis perpendicular to the longitudinal axis define a horizontal plane, and wherein the camera has a centerline that intersects the horizontal plane at an angle in a range selected from a group consisting of 0° or more and 30° or less, 0° or more and 20° or less, and 0° or more and 10° or less.

10. The apparatus of claim 1, wherein the support device supports the pharmaceutical cylindrical container so that the longitudinal axis and a vertical axis perpendicular to the longitudinal axis define a vertical plane, and wherein the camera has a centerline that intersects the vertical plane at an angle of 60° or more and 90° or less, 70° or more and 90° or less, and 80° or more and 90° or less.

11. The apparatus of claim 1, wherein the support device supports the pharmaceutical cylindrical container so that a horizontal axis perpendicular to the longitudinal axis and a vertical axis perpendicular to the longitudinal axis intersect a middle of a cylindrical part of the pharmaceutical cylindrical container at a transversal plane, and wherein the camera has a centerline that intersects the transversal plane at an angle in a range selected from a group consisting of 0° or more and 30° or less, 0° or more and 20° or less, and 0° or more and 10° or less.

12. The apparatus of claim 1, wherein the inspection beam comprises unpolarized light.

13. A method for inspecting a pharmaceutical cylindrical container made of a cycloolefin copolymer (COC) or a cycloolefin polymer (COP), comprising:
illuminating the pharmaceutical cylindrical container with a first light emitting unit;
receiving light emitted by the pharmaceutical cylindrical container with a light receiving unit to acquire a first image of the pharmaceutical cylindrical container;
receiving light scattered by and/or transmitted through the pharmaceutical cylindrical container with the first light receiving unit or a second light receiving unit to acquire a second image of the pharmaceutical cylindrical container; and
characterizing defects in and/or on the pharmaceutical cylindrical container based on a comparison of the first image showing emitted light and the second image showing scattered and/or transmitted light
analyzing the defects to identify slides in the COC or COP of the pharmaceutical cylindrical container.

14. The method of claim 13, further comprising:
illuminating the pharmaceutical cylindrical container with a second light emitting unit, the second light emitting unit having a different wavelength, intensity, size, and/or polarization of emitted light than the first light emitting unit.

15. The method of claim 13, wherein the second image is acquired by receiving light scattered by and/or transmitted through the pharmaceutical cylindrical container with the second light receiving unit.

16. The method of claim 13, further comprising controlling a process of manufacturing the pharmaceutical cylindrical container based on identified slides in the COC or COP of the pharmaceutical cylindrical container.

17. The method of claim 13, further comprising disregarding, based on the first image and/or second image, any pharmaceutical cylindrical container exhibiting a value of Y and/or Z of 0.05 to 1.0,
wherein Y=A1/B1,
wherein A1 is a maximum length in cm of any slide in a cylindrical part of the pharmaceutical cylindrical container,
wherein B1 is a length in cm of the cylindrical part of the pharmaceutical cylindrical container,
wherein Z=A2/B2,
wherein A2 is an area in $cm^2$ of any slides, and
wherein B2 is an area in $cm^2$ of the cylindrical part.

18. The method of claim 17, wherein the value of Y and/or Z is 0.5 to 1.0.

19. The method of claim 17, wherein the value of Y and/or Z is 0.05 to 1.0.

20. The method of claim 13, wherein the illuminating, receiving, and characterizing defects steps for each pharmaceutical cylindrical container are completed in 1 second or less.

* * * * *